Dec. 11, 1928.   1,694,536
C. B. FOLEY
ELECTRIC FURNACE
Original Filed March 13, 1920
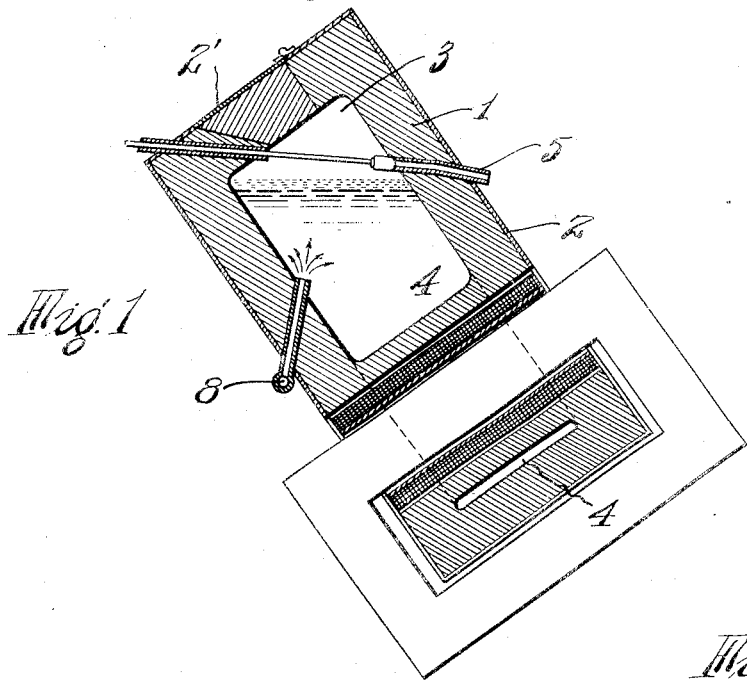
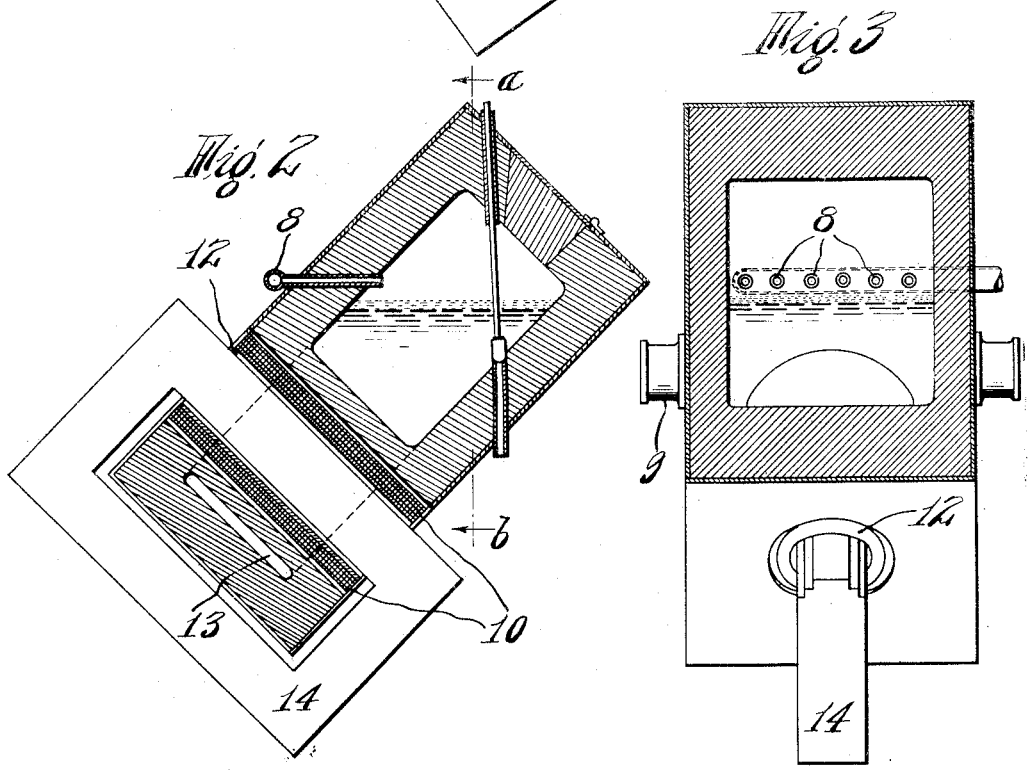
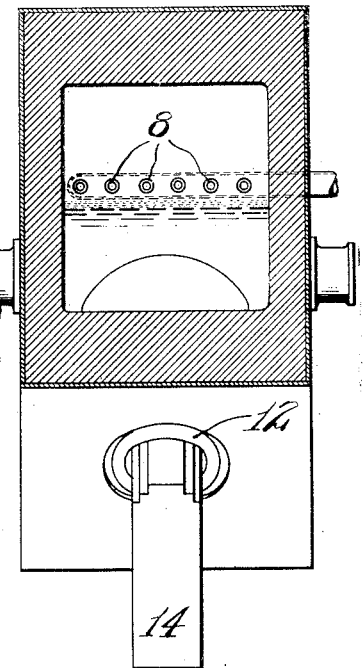
INVENTOR
CHARLES B. FOLEY.
BY
Edward C. Sasnett.
ATTORNEY Patented Dec. 11, 1928.

1,694,536

UNITED STATES PATENT OFFICE.

CHARLES B. FOLEY, OF FORT WAYNE, INDIANA, ASSIGNOR TO CHARLES B. FOLEY, INC., OF NEW YORK, N. Y., A CORPORATION OF NEW YORK.

ELECTRIC FURNACE.

Application filed March 13, 1920, Serial No. 365,633. Renewed April 14, 1927.

My invention relates to furnaces of the tilting type; particularly to electric induction furnaces of the tilting type adapted for both melting and refining.

To carry out the objects of the invention, I provide my furnace with trunnions, as in the ordinary tilting furnace, and arrange the tap nozzle and gas tuyères so that the tap nozzle is out of the charge while the melting or refining is going on, the tuyères being then below the melt if it is desired to melt and refine simultaneously. When the charge is poured the position of the tap nozzle and tuyère, as regards the charge, is reversed, the tuyère being above the melt and the tap nozzle below. It is to be understood, however, that my invention is not limited to a furnace having both a tap nozzle and tuyère arranged in this particular relation; for the tap nozzle and tuyère present features of novelty in themselves effecting very desirable results, and either can be used without the other when the conditions do not require the combined action of both.

In the drawings forming part of this application,—

Fig. 1 is a vertical section through the furnace during melting or refining;

Fig. 2 is a similar section of the furnace in the tapping position;

Fig. 3 is a section of Fig. 2 on the line $a$—$b$ looking in the direction of the arrows.

Referring to the drawings, 1 is the furnace body of refractory material surrounded by a metallic casing 2; 2' is the feed door; 3, the melt chamber containing the charge 4; 5 is the tapping nozzle controlled by the plug 6, operated by the rod 7 which extends outside the furnace body. 8 are tuyères for supplying air or gas to the furnace chamber; 9 are the ordinary trunnions; 10 is the primary of the current-inducing means which passes through a tube 12 located in the lower portion of the crucible chamber having a constricted passage 13 for the melt, and 14 is the core of the current-inducing means.

The electro-thermic action of the furnace consists in inducing alternating currents in the charge 4 which forms the secondary of the transformer system constituting the electro-thermic portion of the furnace, these induced currents generating sufficient heat to melt the charge and keep it at the desired degree of fluidity.

The tapping system, composed of the nozzle 5, the plug 6 and rod 7, is set in the furnace at an angle to the vertical axis of the furnace and the tuyères are preferably let into the furnace at an angle to the same axis and preferably at a right angle to the tapping system. The result of this arrangement is that under normal melting conditions the tapping system lies above the surface of the melt and the tuyères below, while during tapping the conditions are reversed. This effects a very considerable saving of wear and tear of the tapping system, it being immersed only during the tapping operation. In refining copper and other metals there are often found in the melt substances that rapidly attack the material of which the tapping device is composed when at high heat and render frequent repair or replacement necessary.

When it is desired to treat the metal in a nonoxidizing atmosphere, the furnace is brought to the position of Fig. 2 and the desired gas introduced through the tuyères.

During the melting or refining operation, the furnace is tilted to the position shown in Fig. 1, thus exposing a larger surface of the metal to the action of the refining slags and making the refining more perfect. Moreover, the inclined position renders the removal of useless slags, charcoal, or other foreign substance easy through the door 2. Arranging the furnace as a tilting one and locating the tapping system as I do, I can by tilting the furnace into the position of Fig. 1 easily obtain access to the tapping system; and by tilting to the position shown in Fig. 2, I can remove or repair the tuyères 8. Either of these operations can be carried out when the furnace is under heat in normal operation. The convenience and economy of such an arrangement is apparent. Moreover, by so arranging the parts of my furnace I am able to maintain the constricted portion of my molten secondary uninterrupted so that no disturbance of electrical conditions will take place and the melt will not freeze during the tapping. By arranging the tapping nozzle at an acute angle to the longitudinal axis of the furnace, I can pour in a vertical direction from a point well below the surface of the melt with the furnace at a convenient inclination, the amount of metal tapped being under perfect control by means of the plug and rod. The great advantage of this arrangement over pouring from a lip is that the metal is poured from a point below the surface of the melt, thereby preventing slag or floating oxides from getting into the moulds; and the metal is poured from a point fixed with respect to the moulds during the entire pouring operation.

To recapitulate: For melting or refining, tilt the furnace into the position shown in Fig. 1, maintaining the proper electrothermic conditions. To treat in any desired atmosphere, tilt to the position shown in Fig. 2 and when the operation is completed do the tapping.

It is obvious that the furnace may be formed of refractory material itself without the metal casing, the purpose of which is only to add strength to the device as a whole. The tapping rod 7 and the plug 6 can also be replaced by outside luting of the tap nozzle, but the arrangement shown is more convenient and while not absolutely necessary, is preferred.

I claim—

1. In a furnace of the tilting type, the combination of a tapping device including movable means for opening and closing the outlet and a gas inlet extending through the side walls of the furnace and so located that, during normal operation, the tapping device is above the surface of the melt while the gas inlet is below the surface of the melt.

2. In a furnace of the tilting type adapted for treating metals in the molten state and refining them, a tapping system, including movable means for opening and closing the outlet, traversing the furnace at an angle to the vertical axis of the furnace above the melt when the furnace is in normal operation, in combination with a gas supply pipe entering the furnace below the surface of the melt at practically a right angle to the tapping system.

CHARLES B. FOLEY.